US010905275B2

(12) United States Patent
Jeong et al.

(10) Patent No.: US 10,905,275 B2
(45) Date of Patent: Feb. 2, 2021

(54) JUICER HAVING JUICE EXTRACTING SCREW ASSEMBLY

(71) Applicant: Coway Co., Ltd., Gongju-si (KR)

(72) Inventors: Dae Jung Jeong, Seoul (KR); Eui Seong Jeong, Seoul (KR); Yeon Soo Seong, Seoul (KR)

(73) Assignee: Coway Co., Ltd.

( * ) Notice: Subject to any disclaimer, the term of this patent is extended or adjusted under 35 U.S.C. 154(b) by 359 days.

(21) Appl. No.: 15/710,167

(22) Filed: Sep. 20, 2017

(65) Prior Publication Data

US 2018/0008078 A1 Jan. 11, 2018

Related U.S. Application Data

(63) Continuation of application No. 13/881,495, filed as application No. PCT/KR2011/007943 on Oct. 24, 2011, now Pat. No. 9,788,676.

(30) Foreign Application Priority Data

Oct. 25, 2010 (KR) .......................... 10-2010-0103996
Mar. 31, 2011 (KR) .......................... 10-2011-0029909
Mar. 31, 2011 (KR) .......................... 10-2011-0029910
Mar. 31, 2011 (KR) .......................... 10-2011-0029911

(51) Int. Cl.
*B30B 9/14* (2006.01)
*A47J 19/06* (2006.01)
*B30B 9/12* (2006.01)
*A47J 19/02* (2006.01)

(52) U.S. Cl.
CPC .............. *A47J 19/06* (2013.01); *A47J 19/025* (2013.01); *B30B 9/12* (2013.01); *B30B 9/128* (2013.01); *B30B 9/14* (2013.01)

(58) Field of Classification Search
CPC ........... B30B 9/12; B30B 9/124; B30B 9/128; B30B 9/14; A47J 19/02; A47J 19/025; A47J 19/027; A47J 19/06; A47J 43/042; A47J 43/046; A47J 43/08; A47J 31/44
USPC ............................................ 100/117; 99/501
See application file for complete search history.

(56) References Cited

U.S. PATENT DOCUMENTS

| 6,050,180 A * | 4/2000 | Moline ................. A47J 19/027 241/37.5 |
| 2005/0056161 A1 | 3/2005 | Le Rouzic |
| 2007/0209528 A1* | 9/2007 | Chang ................... A47J 19/027 99/511 |
| 2009/0049998 A1* | 2/2009 | Kim ....................... A47J 19/025 99/510 |
| 2012/0137899 A1 | 6/2012 | Kim |

(Continued)

FOREIGN PATENT DOCUMENTS

| CN | 101355897 A | 1/2009 |
| JP | H11-253302 A | 9/1999 |
| JP | 2008-593 A | 1/2008 |

(Continued)

*Primary Examiner* — Jimmy T Nguyen
(74) *Attorney, Agent, or Firm* — Finnegan, Henderson, Farabow, Garrett & Dunner, LLP (57) ABSTRACT

A juicer having a juice extracting screw assembly, in which a housing with a juice extracting screw installed in the housing has a simplified interior structure, thereby reducing the production cost of the juicer and easily dispensing juice and residue separately using respective passages.

16 Claims, 8 Drawing Sheets

(56) References Cited

U.S. PATENT DOCUMENTS

2012/0266762 A1   10/2012  Wang et al.
2012/0291638 A1   11/2012  Kim

FOREIGN PATENT DOCUMENTS

| KR | 20-0288606 Y1 | 9/2002 |
| KR | 10-2005-0034883 A | 4/2005 |
| KR | 10-2006-0101848 A | 9/2006 |
| KR | 10-0966607 B1 | 6/2010 |
| WO | WO 2007/148872 A1 | 12/2007 |
| WO | WO 2010/007290 A2 | 1/2010 |
| WO | WO 2013/053228 A1 | 4/2013 |

\* cited by examiner

JUICER HAVING JUICE EXTRACTING SCREW ASSEMBLY

CROSS-REFERENCE TO RELATED APPLICATIONS

This application is a continuation of and claims the benefit of and priority to U.S. application Ser. No. 13/881,495, filed Jul. 12, 2013, which is a national phase application under 35 U.S.C. § 371 of PCT/KR2011/007943, filed Oct. 24, 2011, which claims priority to Korean Application No. 10-2011-0029911, filed Mar. 31, 2011; Korean Application No. 10-2011-0029910, filed Mar. 31, 2011; Korean Application No. 10-2011-0029909, filed Mar. 31, 2011; and Korean Application No. 10-2010-0103996, filed Oct. 25, 2010. All of these applications are hereby incorporated by reference in their entirety.

TECHNICAL FIELD

The present invention relates, in general, to a juicer and, more particularly, to a juicer having a juice extracting screw assembly, in which a housing with a juice extracting screw installed in the housing has a simplified interior structure, thereby reducing the production cost of the juicer and easily dispensing juice and residue separately using respective passages.

BACKGROUND ART

To use a conventional juicer, fruits or vegetables are put into a housing having a rotatable crushing screw therein and the crushing screw is rotated by a drive motor placed below the housing, thereby crushing and squeezing the fruits and vegetables and extracting juice from the fruits or vegetables, to make juice that can be drunk by a user. Although the conventional juicer is advantageous in that the fruits, etc. can be crushed into small pieces by the crushing screw that is rotated at a high speed so that the crushing of the fruits, etc. can be quickly finished, the conventional juicer is problematic in that the fruits, etc. are crushed by the crushing screw at high speed, so that the characteristic taste and nutrients of the fruits may be destroyed during the high-speed crushing process.

In an effort to solve the problem, in recent years, a juicer in which the rotating speed is reduced and the torque is increased using reduction gears has been under the spotlight.

In the juicer, the crushing screw is received in a meshed housing and there is a meshed housing guide protrusion for guiding the meshed housing protrudes in the center of the interior of the housing. However, this juicer is problematic in that the meshed housing guide protrusion disturbs the smooth flow of the juice in the housing. In other words, when the juice is discharged from the housing, it is not easy to discharge the juice due to the height of the meshed housing guide protrusion.

Further, when using the juicer, the housing is locked to the main body having the drive motor. However, in the conventional juicer, the junction of the main body and the housing has an L-shaped undercut structure so that the locking of the housing to the main body cannot be realized by simply seating the housing on the main body, but it is necessary to rotate the housing relative to the main body.

Further, when a juicer is fabricated using an excessive number of elements in an effort to solve the problem, it is necessary to disassemble the elements and to separately wash the elements which is inconvenient for users. For example, when the juicer has four elements to be washed after a juice extraction process is finished, a user disassembles the juicer and must separately wash the four elements one by one.

DISCLOSURE

Technical Problem

Accordingly, the present invention has been made keeping in mind the above problems occurring in the related art, and is intended to provide a juicer capable of separately dispensing juice and residue.

Further, the present invention serves to provide a juicer which can be easily disassembled and assembled when it is required to wash the juicer, and which can reduce the number of elements to be disassembled and washed and has a simple construction, thereby being easily maintained by a user before and after using the juicer.

Further, the present invention serves to provide a juicer whose juice extraction ratio is an improvement over that of a conventional juicer, thereby providing a larger amount of juice when the same amount of raw material is put into the juicer.

Further, the present invention serves to provide a juicer, in which injection-molded elements have improved durability and, accordingly, the elements are not easily damaged even when the juicer is repeatedly used for a lengthy period of time.

Solution to Problem

In order to solve the above-mentioned technical problems, the present invention provides a juicer, including: a housing; a juice extracting screw assembly rotatably installed in the housing; and a main body receiving juice and residue discharged from the housing, wherein a strainer is provided on a lower end of the juice extracting screw assembly and introduces the juice extracted from a raw material in the housing by a rotation of the juice extracting screw assembly into the juice extracting screw assembly.

Advantageous Effects

As described above, the present invention is advantageous in that the juice extracting screw assembly rotated in the housing can easily separate the juice and the residue from the raw material put into the housing based on the outer surface of the juice extracting screw assembly.

Further, the present invention is advantageous in that the juice discharge hole and the residue discharge hole protruding downwards from the lower surface of the housing are respectively inserted into the juice dispensing hole and into the residue dispensing hole so that the housing and the main body can be easily assembled and disassembled without rotating them.

Further, in the present invention, the juice extraction process can be realized using the integrated juice extracting screw assembly and the integrated housing, so that the present invention has a simple construction and reduces the production cost of the juicer and allows the juicer to easily be maintained by a user.

Further, the present invention increases the durability of the elements and realizes an improved juice extraction ratio.

MODE FOR INVENTION

A juicer 100 having a juice extracting screw assembly according to a preferred embodiment of the present invention will be described in detail with reference to the accompanying drawings. Here, it should be understood that the thicknesses of lines and sizes of the elements shown in the drawings may be exaggerated when drawn to provide an easily and clearly understood description of the structure of the present invention. Further, the technical terms used in the description are defined in light of the functions of elements of the present invention and, accordingly, it should be understood that the technical terms may be changed according to intentions of users and workers and according to custom. Therefore, it is required that the definition of the technical terms be determined based on the contents of the present invention extending throughout the entire description.

In the present invention, the technical term "juice extraction" will be used in the description to cover the entire process including the cutting, crushing and squeezing of a raw material and/or the extracting of juice from the raw material.

In the present invention, it will be described that when a raw material is processed by the juicer, "juice" and "residue" are produced. The technical term "juice" will mean an objective that is extracted from the raw material and is taken by a user. The technical term "residue" will mean the remnant that remains after extracting juice and may be typically exhausted to the outside. Further, the technical term "juice extraction ratio" will mean the proportion of juice to the raw material.

1. Description of a Juicer 100 According to a First Embodiment

Hereinbelow, the juicer 100 according to the first embodiment will be described with reference to FIGS. 1 through 6.

Figure 1:
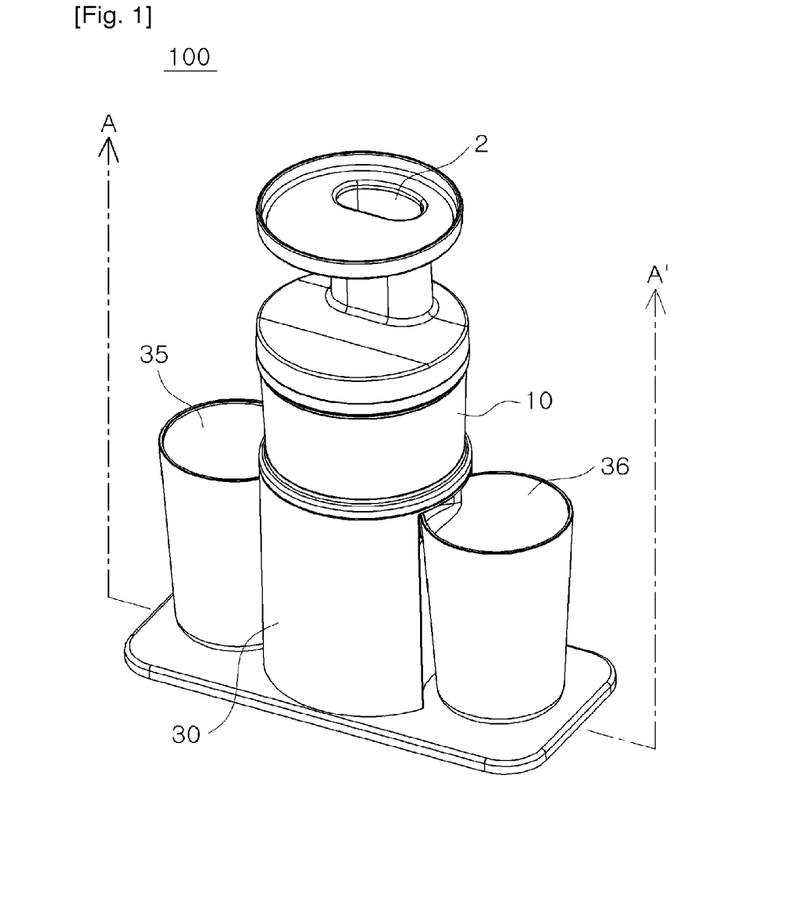
FIG. 1 is a perspective view of a juicer having a juice extracting screw assembly according to a first embodiment of the present invention.
Figure 2:
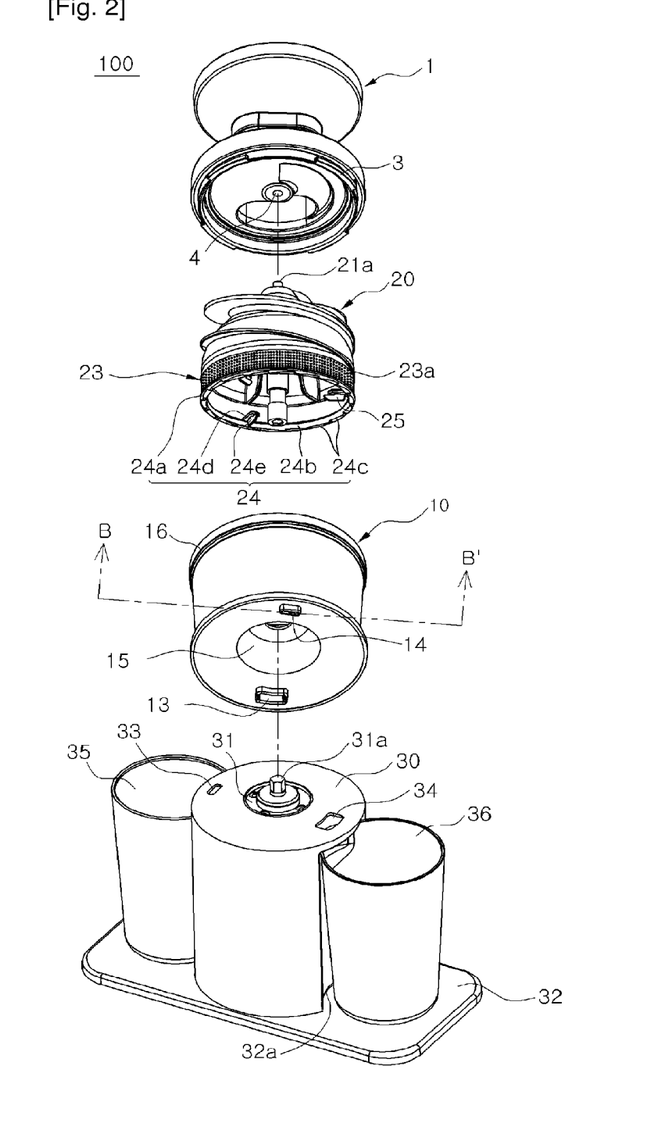
FIG. 2 is an exploded perspective view of the juicer having the juice extracting screw assembly according to the first embodiment of the present invention.

The juicer 100 according to the first embodiment of the present invention may include a lid 1 having a feed hole 2, a hollow housing 10 fastened to the lid 1, a juice extracting screw assembly 20 rotatably installed in the housing 10, and a main body 30 placed below the housing 10 and separately containing therein the juice and the residue discharged from the housing 10.

The lid 1, the housing 10, the juice extracting screw assembly 20 and the main body 30 will be sequentially described in detail hereinbelow.

The lid 1 includes the feed hole 2, a plurality of locking ribs 3 and a rotating shaft hole 4.

In the lid 1, the feed hole 2 for feeding a raw material into the juicer is thoroughly formed from the upper surface to the lower surface of the lid 1. A pusher (not shown) is movably inserted into the feed hole 2 and easily pushes food put into the feed hole 2.

In addition, the bottom surface of the interior of the lid 1 that is connected with the feed hole 2 may be tilted so that food can enter a housing 10 smoothly, as shown in FIG. 2.

In the center of the lower surface of the lid 1, a rotating shaft hole 4 is formed and receives therein an upper rotating shaft 21a of a juice extracting screw 22, which will be described later herein. The rotating shaft hole 4 may be formed in the center of the lower surface of the lid 1, while the feed hole 2 is formed at a location eccentric from the center having the rotating shaft hole 4 by a predetermined distance so that the juice extracting screw 22 can be easily rotated and a raw material easily put into the feed hole 2. Further, the plurality of the locking ribs 3 are formed to protrude from the edge of the lower surface of the lid 1.

Figure 3:
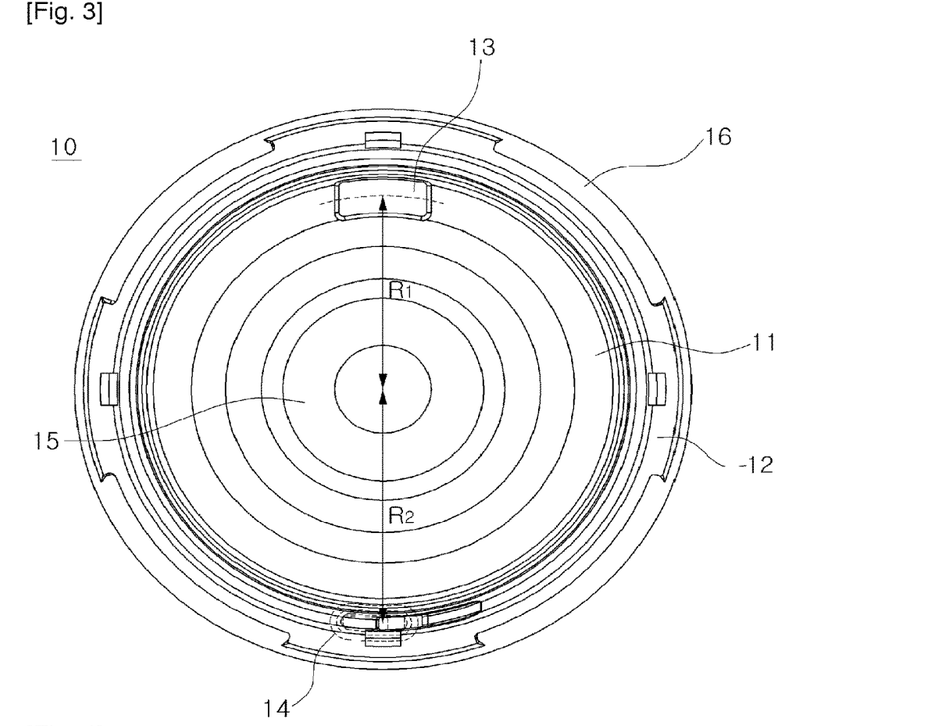
FIG. 3 is a bottom view of a housing according to the first embodiment of the present invention.

The housing 10 has a hollow cylindrical container structure, with a first guide groove 11 and a second guide groove 12 formed on the bottom surface of interior of the housing 10, a juice discharge hole 13 formed in the first guide groove 11, a residue discharge hole 14 formed in the second guide groove 12, and a waterproof cylinder 15 formed on the center of the bottom surface of the interior of the housing 10.

The first guide groove 11 has a circular-shaped structure having a first radius R1 from the center of the bottom surface of the interior of the housing 10, with the juice discharge hole 13 formed through the bottom of the housing 10 at a predetermined location in the first guide groove 11.

The second guide groove 12 is formed on the bottom surface of the interior of the housing 10 such that the second guide groove 12 is concentric with the first guide groove 11 and has a second radius R2 larger than that of the first guide groove 11. The residue discharge hole 14 is formed through the bottom of the housing 10 at a predetermined location in the second guide groove 12. Further, the juice discharge hole 13 and the residue discharge hole 14 protrude downwards from the lower surface of the bottom of the housing 10 to a predetermined height.

As described above, in the housing 10, the first circular guide groove 11 having the juice discharge hole 13 and the second circular guide groove 12 having the residue discharge hole 14 may be sequentially formed on the bottom surface of the interior of the housing 10 such that they are arranged concentrically with each other relative to the center of the bottom surface. In addition, a barrier is formed between the first guide groove 11 and the second guide groove 12 preventing the flow between the juice and residue.

The waterproof cylinder 15 having a taper shape is formed on the center of the bottom surface of the interior of the hollow housing 10. The center of the upper surface of the waterproof cylinder 15 has a hole in it.

A plurality of locking ribs 16 are formed along the edge of the upper end of the housing 10 such that the locking ribs 16 may correspond to the locking ribs 3 of the lid and may be locked thereto.

When the locking ribs 3 of the lid 1 are locked to the locking ribs 16 of the housing by being placed and rotated relative to the locking ribs 16, the locking ribs 16 function to guide the movement of the locking ribs 3 and to prevent the locking ribs 3 from being removed from the locking ribs 16, thus fastening the lid 1 to the housing 10.

Figure 4:
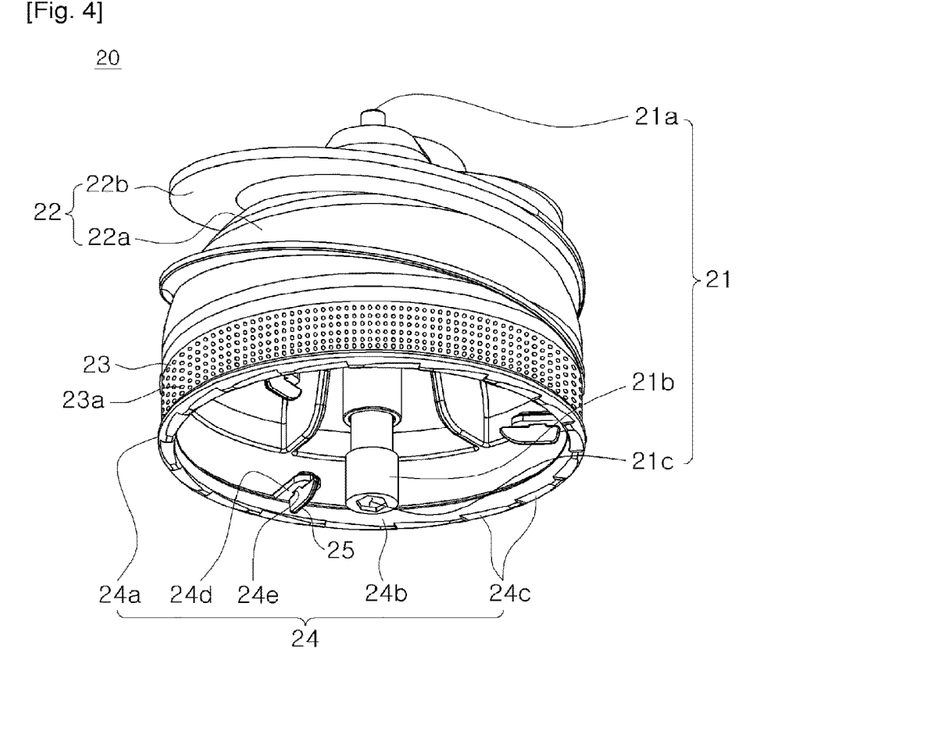
FIG. 4 is a perspective view of the juice extracting screw assembly according to the first embodiment of the present invention.

The juice extracting screw assembly 20 includes a rotating shaft 21, the juice extracting screw 22, a strainer 23, a strainer holder 24 and a brush 25.

The rotating shaft 21 is a cylindrical rotary member and includes the upper rotating shaft 21a, a lower rotating shaft 21b and an angled shaft hole 21c.

The upper rotating shaft 21a is smaller in diameter than the rotating shaft 21 and protrudes upwards from the upper end of the rotating shaft 21. The upper rotating shaft 21a is inserted into the rotating shaft hole 4 of the lid 1 and is immobile at coordinates in all directions (x-axis, y-axis and z-axis) except for the rotating direction.

Because the juice extracted from a raw material in the housing 10 is taken by a person, the material used to make the rotating shaft 21 may be stainless steel (KS:STS, JIS:SUS) that is produced by adding lots of nickel-chromium to a face-centered cubic crystal which is a steel crystal stable at temperatures of 900~1400° C. and has improved corrosion resistance.

The lower rotating shaft 21b is provided on the lower end of the rotating shaft 21 and the angled shaft hole 21c is formed in the lower rotating shaft 21b such that the angled shaft hole 21c is axially aligned with the upper rotating shaft 21a.

The juice extracting screw 22 includes a screw body 22a, which surrounds the rotating shaft 21, and a juice extracting blade 22b.

The juice extracting blade 22b is at least one blade which is spirally formed around the outer surface of the screw body 22a after starting at a predetermined position on a lower part of the outer surface of the screw body 22a. The juice extracting screw 22 is seated over the waterproof cylinder 15 inside the housing 10 and rotates to extract juice from a raw material, thus producing the juice.

The strainer 23 is mounted to the lower end of the juice extracting screw 22 and is produced using a hollow cylindrical material having a predetermined height, with a straining hole 23a formed in the strainer 23.

The material of the strainer 23 may be stainless steel (KS:STS, JIS:SUS) which has improved corrosion resistance which was improved upon in the same manner as was described for the rotating shaft 21.

The straining hole 23a comprises a plurality of straining holes formed in the strainer 23 and of course the number of straining holes 23a is not limited to a specific number. However, when the juice extracting screw 22 is rotated in the housing 10 and extracts juice from the raw material, the straining holes 23a function to allow the juice to pass through the straining holes 23a and to flow into the strainer 23 and function to prevent the residue from being introduced into the strainer 23, thereby separating the juice from the residue, so that the size of the straining holes 23a may be determined to efficiently separate the juice from the residue.

Referring to FIG. 4, a distance between the straining holes 23a gets smaller sequentially as they near the bottom of the juice extracting screw assembly 20.

And certainly the juice extracting screw assembly 20 has a container having a space large enough to hold the juice passed through the straining holes 23a.

The juice extracting screw 22 and the strainer 23 are produced in the form of an integrated structure by an insert injection molding process and are rotated in the housing 10, thereby extracting juice from the raw material put into the juicer. However, during the insert injection molding process for producing the products, the fill factor of the products is determined by the mold temperature, pressure maintaining time, pressure, resin temperature, injection speed, injection pressure, cooling time, cushion, etc. and the above-mentioned factors are important factors determining the quality of the product, so that it is preferred that the product be produced under the optimum conditions. Further, the insert injection molding process performed under the optimum conditions reduces the cases of bad quality of the injection-molded product, such as weld lines, sink marks, burnt streaks, moisture streaks, color streaks, and air streaks or jetting, so that the optimum conditions can reduce the cases of bad quality of the products and can reduce the production cost.

The strainer holder 24 includes a holder body 24a, an outer rib 24b, a brushing protrusion 24c, an inner rib 24d and an inner rib slot 24e.

The holder body 24a has a circular band-shaped structure having a predetermined width, with a fitting groove (not shown) formed along a center line of the circular holder body 24a so that the lower end of the strainer 23 can be fitted into the fitting groove (not shown) and the strainer 23 and the holder body 24a can be rotated in the form of an integrated structure.

The outer rib 24b extends downwards from the holder body 24a, with the stepped brushing protrusion 24c formed on the lower end of the outer rib 24b. The brushing protrusion 24c is rotated along the second guide groove 12 and feeds the residue that has not passed through the strainer 23 to the residue discharge hole 14 which will be described later herein.

The inner rib 24d radially extends from the holder body 24a inwards to a predetermined distance so that the inner rib 24d has a radial arrangement oriented to the center of the holder body 24a. Here, it is preferred that three inner ribs 24d be provided in the strainer holder as shown in FIG. 3. However, it should be understood that the number of the inner ribs may be changed depending on the usage.

The inner rib slot 24e is vertically formed through the center of each of the inner ribs 24d.

Further, to mount the brush 25 to the inner rib slot 24e, it is preferred that the upper part of the brush 25 have a T-shaped appearance and that the lower part be wider than the first guide groove 11 formed on the bottom surface of the housing 10. The brush 25 made of a soft material and mounted to the inner rib slot 24e is rotated along with the strainer holder 24 and guides the juice, which has been introduced into the strainer 23, into the juice discharge hole 13 while passing over the first guide groove 11.

The main body 30 has a cylindrical structure which is depressed on diametrically opposite side surfaces thereof and can include a motor 31, a base 32, a juice container 36 and a residue container 36.

Further, the upper surface of the main body 30 can be provided with a juice dispensing hole 33 and a residue dispensing hole 34 which is diametrically opposed to the juice dispensing hole 33.

Figure 5:
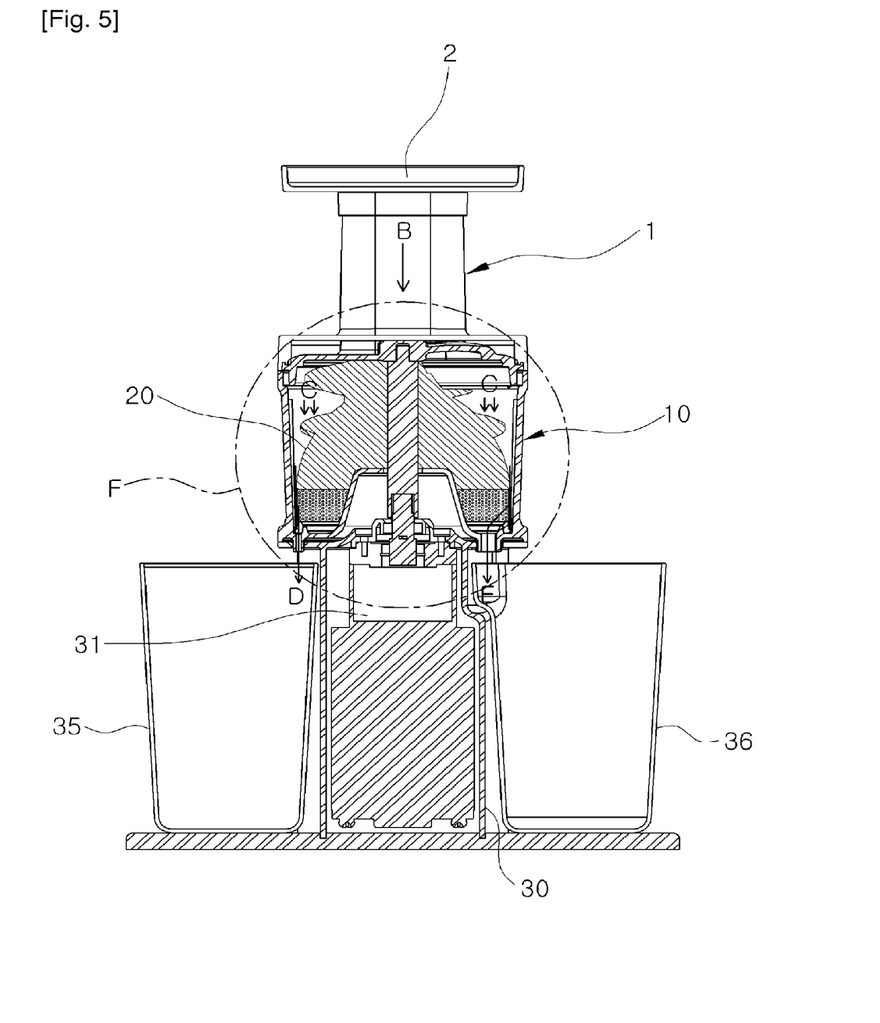
FIG. 5 is a sectional view illustrating the first embodiment of the present invention taken along line A-A' of FIG. 1.

The motor 31 installed in the main body 30 is provided with an angled shaft 31a and rotates the angled shaft 31a when the motor 31 is electrically activated. The angled shaft 31a of the motor 31 is fitted into the angled shaft hole 21c, thereby rotating the rotating shaft 21 having the angled shaft hole 21c. Therefore, the juice extracting screw 22 surrounding the rotating shaft 21 and the juice extracting screw assembly 20 having the juice extracting screw 22 are rotated and extract juice from the raw material put into the juicer.

The base 32 mounted to the lower end of the main body 30 is provided with a depressed base seat 32a for seating the lower end of the main body 30 therein. Here, the base seat may be spaced in order to realize easy installation of the lower end of the main body in the base seat.

The juice dispensing hole 33 communicates with the juice discharge hole, and functions as a passage through which the juice discharged from the juice discharge hole 13 can be dispensed. Here, it is preferred that the size of the juice dispensing hole 33 be larger than that of the juice discharge hole 13 so that the juice discharge hole 13 can be easily connected to the juice dispensing hole 33.

The residue dispensing hole 34 communicates with the residue discharge hole 14 and functions as a passage through which the residue discharged from the residue discharge hole 14 can de dispensed. Here, it is preferred that the size of the residue dispensing hole 34 be larger than that of the residue discharge hole 14 so that the residue discharge hole 14 can be easily connected to the residue dispensing hole 34.

The juice dispensing hole 33 and the residue dispensing hole 34 can play an important roll when the housing 10 is assembled with the main body 30 and are advantageous in that they can more easily assemble the housing 10 with the main body 30 than when conventional locking ribs are used.

The juice container 35 has a hollow cylindrical vessel structure which can be detachably mounted to the depressed sidewall of the main body 30. The juice container 36 communicates with the juice dispensing hole 33 so that a user can easily drink the juice after receiving the juice discharged from the juice discharge hole 13 in the juice container 36.

The residue container 36 has a hollow cylindrical vessel structure which can be detachably mounted to the main body 30 at a location opposed to that of the juice container 36. The residue container 36 communicates with the residue dispensing hole 34.

2. Description of a Juicer 100 According to a Second Embodiment

Hereinbelow, the juicer 100 according to the second embodiment of the present invention will be described in detail with reference to FIGS. 7 through 11.

In the juicer 100 according to the second embodiment of the present invention, the construction of the housing 10 and the juice extracting screw assembly 20 is different from that of the juicer 100 according to the first embodiment of the present invention. The following description of the juicer according to the second embodiment will be concentrated upon the elements different from those of the juicer 100 according to the first embodiment of the present invention and, accordingly, the elements of the second embodiment which are not described hereinbelow are understood as being equivalents of or similar to those of the juicer 100 according to the first embodiment of the present invention the juicer 100.

2.1 Juice Extracting Screw Assembly 20

Figure 8:
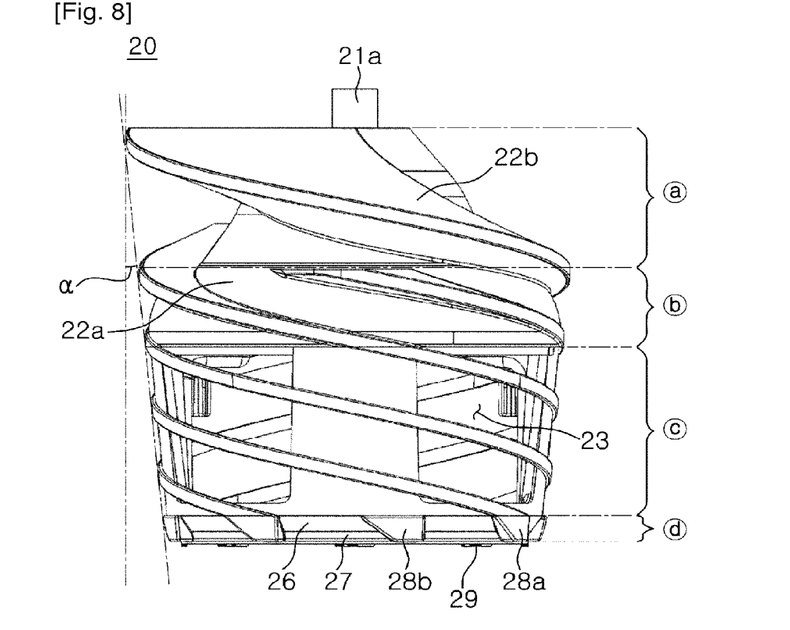
FIG. 8 is a side view of the juice extracting screw assembly according to the second embodiment of the present invention.
Figure 9:
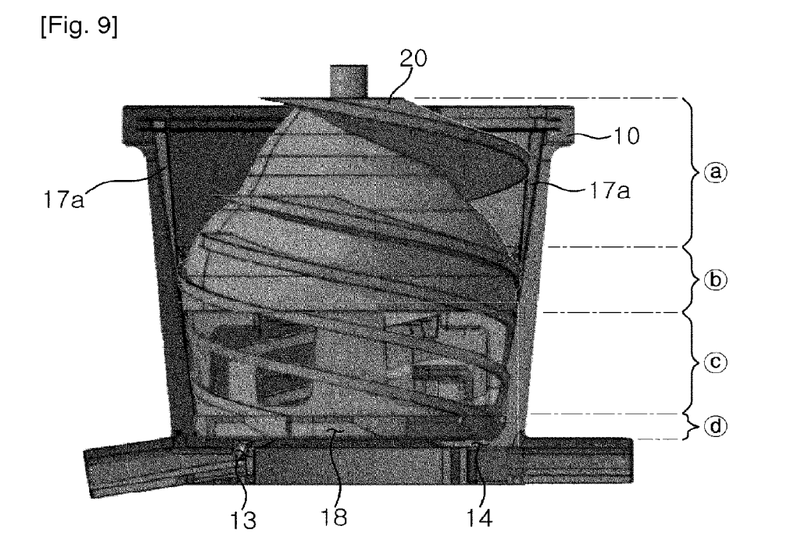
FIG. 9 is a sectional view illustrating just the juice extracting screw assembly and a housing according to the second embodiment of the present invention and corresponding to FIG. 6 showing the first embodiment.

The juice extracting screw assembly 20 will be described by separating the assembly into four sections â, b̂, ĉ and d̂, as shown in FIGS. 8 and 9.

Section â is a part in which the screw body 22a of the juice extracting screw assembly 20 forms a circular conical appearance, with a substantial space defined between the housing 10 and the juice extracting screw assembly 20 and receiving a raw material therein. When the raw material put into the feed hole 2 is charged in the space, the crushing of the raw material is mainly performed by the juice extracting blades 22b provided in the uppermost part. Here, the extraction of a predetermined amount of juice may be realized by the juice extracting blades 22b provided in the uppermost part. The shape of section â is the same as or similar to that of the first embodiment.

Sections b̂ and ĉ are parts in which the screw body 22a of the juice extracting screw assembly 20 forms an inverted circular truncated conical appearance, and the space defined between the housing 10 and the juice extracting screw assembly 20 is narrow so as to squeeze the raw material and gradually tapers downwards to become narrower. In the first embodiment, sections b̂ and ĉ form a cylindrical appearance.

In section b̂, the juice extracting screw assembly 20 has no strainer. Section b̂ is provided to mainly perform the process of squeezing the small pieces of raw material which have been crushed in section â. In this section b̂, the juice and the residue flow downwards along the space defined between the housing 10 and the juice extracting screw assembly 20.

In section ĉ, the juice extracting screw assembly 20 has the strainer 23 and the squeezing process performed in section b̂ is continued. Further, the juice passes through the strainer 23 and flows into the container having a space large enough to hold the juice inside the juice extracting screw assembly 20; however, the residue does not pass through the strainer 23, but moves downwards along the outer surface of the juice extracting screw assembly 20.

Section d̂ is the lowermost part of the juice extracting screw assembly 20 and is provided with a residue check structure for preventing the residue from flowing in reverse. The residue check structure includes a connection part 26 extending downwards from the screw body 22a and tapering inwards; a residue check screen 27 vertically extending downwards from the lower end of the connection part 26; a plurality of residue pushers 28a and 28b forming the lower end of the connection part 26 and located on the side surface of the residue check screen 27; and a plurality of residue check pieces 29 provided on the lower end of the residue check screen 27.

Figure 11:
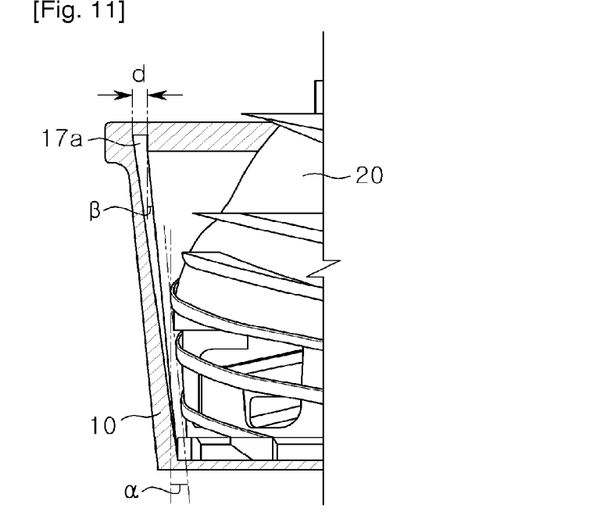
FIG. 11 is a partially sectioned view illustrating the juice extracting screw assembly and the housing according to the second embodiment of the present invention.

When the juice extracting screw assembly 20 is assembled with the housing 10, the residue check structure is inserted into a residue pushing groove 18 formed in the housing 10.

Hereinbelow, the residue pushers 28a and 28b and the residue check pieces 29 will be described in detail with reference to FIGS. 8 and 10. When viewed as in the bottom view of FIG. 10, the juice extracting screw assembly 20 is rotated clockwise.

In the clockwise direction, each of the residue pushers 28a and 28b has a vertical front end and an upwardly inclined rear end. Due to the above-mentioned structure, the residue which has reached the residue pushing groove 18 after flowing downwards through the space defined between the housing 10 and the juice extracting screw assembly 20 is pushed by the vertical front ends of the residue pushers 28a and 28b in response to a rotation of the juice extracting screw assembly and reaches the residue discharge hole 14 and is, thereafter, discharged via the residue discharge hole 14.

Among the residue pushers 28a and 28b, the residue pushers 28a have a structure continuously extending from the juice extracting blades 22b, so that the residue flowing downwards along the juice extracting blades 22b naturally reaches the front ends of the residue pushers 28a and is pushed thereby.

Generally, the number of the spiral juice extracting blades 22b is small, so that, when the residue pushers are formed by only the residue pushers 28a extending from the juice extracting blades 22b, they may fail to stably or efficiently push the residue that does not flow downwards along the juice extracting blades 22b. To overcome the problem, it is preferred that additional residue pushers 28b be provided on the locations that the juice extracting blades 22b do not extend to.

In the embodiment shown in the drawings, four juice extracting blades 22b, four residue pushers 28a and four additional residue pushers 28b are provided.

Further, in the present invention, the housing 10 is not rotated, but only the juice extracting screw assembly 20 installed in the housing 10 is rotated, so that a predetermined space is defined between the juice extracting screw assembly 20 and the residue pushing groove 18 of the housing 10. Therefore, to prevent the residue from flowing in reverse and towards the inside into the juice extracting screw assembly 20, the residue check pieces 29 are provided.

Figure 10:
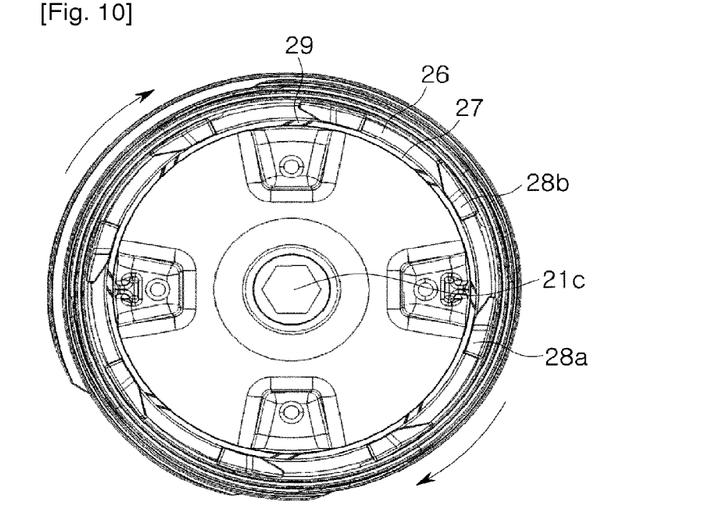
FIG. 10 is a bottom view of the juice extracting screw assembly according to the second embodiment of the present invention.

The residue check pieces 29 protrude downwards from the lower end of the residue check screen 27 by a predetermined distance and have a bent shape which is bent from the outside to the inside in the clockwise rotating direction (see FIG. 10). Further, the residue check pieces 29 are formed on locations adjacent to the inclined rear ends of the residue pushers 28b. Due to the above-mentioned shape and location, the residue check pieces 29 can efficiently prevent the residue from flowing in reverse through the space defined between the juice extracting screw assembly 20 and the residue pushing groove 18 of the housing 10.

In the same manner as that described in the first embodiment, one or more juice extracting blades 22b are spirally formed around the outer surface of the screw body 22a of the juice extracting screw 22. This juice extracting screw 22 is seated over the waterproof cylinder 15 inside the housing and is rotated, thereby squeezing the raw material and extracting juice from the raw material.

Further, in the same manner as that described in the first embodiment, some juice extracting blades may start from section â and may reach the lower end of the juice extracting screw assembly, and the remaining blades may start from section b̂ and may reach the lower end of the juice extracting screw assembly, as shown in FIG. 8. As described above, it is possible to form the juice extracting blades by combining the different juice extracting blades. However, it should be understood that the juice extracting blades 22b formed in section â have a shape suitable for crushing the raw material. In the embodiment shown in the drawings, four juice extracting blades 22b are used.

Unlike the first embodiment, the juice extracting blades 22b extend to section ĉ having the strainer 23. From a plurality of experiments repeatedly performed, the inventor of the present invention noted that when the juice extracting blades 22b extend to the section having the strainer 23, the juice extraction ratio is further improved.

Further, as described above, the juice extracting blades 22b extend to the lower end of the juice extracting screw assembly 20 and are continued to the residue pushers 28a.

Further, it is noted that when the angle α of the taper outer surface of the juice extracting screw assembly 20 relative to the vertical axis in the sections b̂ and ĉ ranges from about 4° to about 10°, it is possible to realize a higher juice extraction ratio and, particularly, when the angle α is about 5°, the highest juice extraction ratio can be realized. The above-mentioned definition of the angle was the result of a plurality of experiments performed by the inventor of the present invention.

2.2 Housing 10

In the first embodiment, a plurality of housing ribs are formed in the housing 10 (see FIG. 6), so that the juice can be extracted by the cooperation of the housing ribs with the juice extracting blades 22b. Here, all the housing ribs of the first embodiment are formed along the entire height of the housing 10.

The first embodiment can realize a relatively high juice extraction ratio. However, in the first embodiment, the squeezing load is eccentrically applied to the housing 10, so that the injection-molded housing 10 may be overloaded and the durability thereof may be ill-affected. To solve this problem which may occur in the first embodiment, the second embodiment uses two types of housing ribs.

Figure 12:
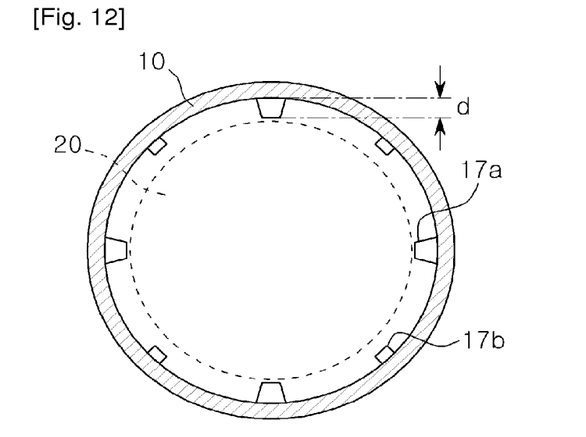
FIG. 12 is a plane view of the housing according to the second embodiment of the present invention.

As shown in FIG. 12, the housing ribs 17a and 17b of the second embodiment include main housing ribs 17a which are formed along the entire height of the housing and subsidiary housing ribs 17b formed along a part of the height of the housing. Here, it is preferred that the subsidiary housing ribs 17b extend from the lower end of the housing 10 to a height corresponding to section b̂. Because the two types of housing ribs having different heights are used, the second embodiment can reduce the eccentrically applied load of the housing 10.

As described above, section â of the juice extracting screw assembly 20 is substantially spaced apart from the housing 10 so that a raw material can be put into a space defined between the housing and the juice extracting screw assembly.

In sections b̂ and ĉ of the juice extracting screw assembly 20, the gap between the juice extracting screw assembly 20 and the housing ribs 17a and 17b of the housing 10 is too narrow for the raw material to be squeezed into sections b̂ and ĉ. Here, it is preferred that the gap between the juice extracting screw assembly and the housing ribs become narrower in a downward direction. To this end, the angle β between the vertical axis and the housing ribs 17a and 17b of the housing 10 should be larger than the angle α between the vertical axis and the juice extracting screw assembly 20. It is noted that when the angle β ranges from about 5° to about 10°, it is possible to realize a higher juice extraction ratio and, particularly, when the angle β is about 8°, the highest juice extraction ratio can be realized. The above-mentioned definition of the angle was the result of a plurality of experiments performed by the inventor of the present invention.

Further, when the thickness d of the housing ribs 17a and 17b is excessively large, the juice extraction ratio is reduced, however, when the thickness d is excessively small, the raw material may fail to be smoothly fed. From a plurality of experiments performed by the inventor of the present invention, it is noted that the thickness of the housing ribs 17a and 17b preferably ranges from about 0.5 mm to about 1.0 mm and is most preferably set to about 0.7 mm.

3. Description of the Operational Theory of the Juicer 100

The operation of the juicer 100 having the juice extracting screw assembly according to the first and second embodiments of the present invention will be described in detail.

Figure 6:
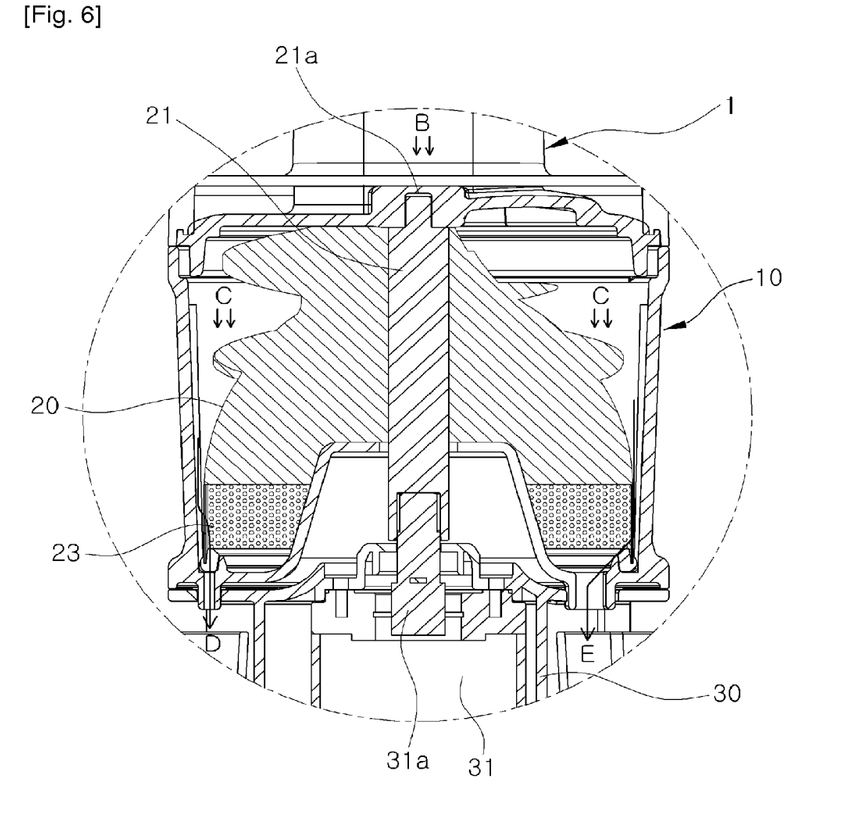
FIG. 6 is a sectional view illustrating a part of the first embodiment of the present invention shown by the portion F of FIG. 5 and showing a flow passage extending through a lid, a juice extracting screw and a main body.
Figure 7:
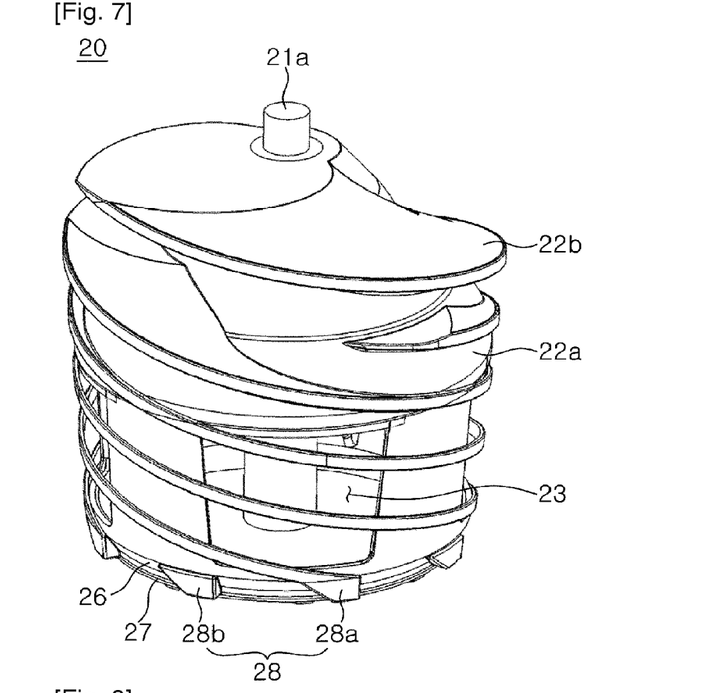
FIG. 7 is a perspective of a juice extracting screw assembly according to a second embodiment of the present invention.

When a raw material is put into the feed hole 2 of the lid 1, the upper surfaces of the juice extracting blades 22b of the juice extracting screw assembly 20 intersect the lower end of the feed hole 2 and cut the raw material prior to feeding the cut material into the housing 10 desirably along the tilted bottom surface of the lid 1 (B~C). When the cut material is fed into the housing 10, the material is further crushed and squeezed while being fed downwards. In the above-mentioned process, the juice is introduced into the strainer 23 integrated with the lower part of the juice extracting screw 22 after passing through the straining holes 23a of the strainer (C). The juice that has been introduced into the strainer 23 flows through the juice discharge hole 13 by the rotating force of the brush 25 and is dispensed via the juice dispensing hole 33, thus being collected in the juice container 36 (E).

In the above state, the residue that does not pass through the straining holes 23a is collected on the bottom surface of interior of the housing 10 (C). The residue which has been collected on the bottom surface of interior of the housing 10 is fed to the residue discharge hole 14 by the rotating force of the outer ribs 24b stepped in the lower end of the strainer holder 24 and is dispensed via the residue dispensing hole 34, thus being collected in the residue container 36 (D).

INDUSTRIAL APPLICABILITY

As described above, the juicer 100 having the juice extracting screw assembly 20 according to the present invention is advantageous in that the juice extracting screw assembly 20 rotatably installed in the housing 10 efficiently separates the juice and the residue from a raw material put into the housing 10, based on the outer surface of the juice extracting screw assembly 20.

Further, the juice discharge hole 13 and the residue discharge hole 14 protruding downwards from the lower surface of the housing 10 are respectively inserted into the juice dispensing hole 33 and into the residue dispensing hole 34 so that the housing and the main body can be easily assembled and disassembled without rotating them.

Further, in the present invention, the juice extraction process can be realized using the integrated juice extracting screw assembly and the integrated housing, so that the present invention can realize a simple and light construction and a reduction in the production cost of the juicer.

Although the embodiment of the present inventions of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A juicer, comprising:
a housing;
a juice extracting screw assembly rotatably installed in the housing, wherein the juice extracting screw assembly comprises:
a juice extracting screw comprising a screw body and at least one juice extracting blade on an outer surface of the screw body; and
a strainer mounted to an outer circumferential surface of a lower part of the juice extracting screw and extended downwardly from the lower part of the juice extracting screw; and
a residue check structure for preventing residue from flowing in reverse, the residue check structure being provided on a lower end of the juice extracting screw assembly,
wherein the residue check structure is inserted into a residue pushing groove formed in the housing and provided on a lower part of the strainer.

2. The juicer set forth in claim 1, wherein the juice extracting blade is configured to direct raw material toward a space between the housing and an outer surface of the strainer such that juice is capable of being extracted from raw material in the space and being introduced inside the strainer, and the residue is capable of being introduced into the residue pushing groove, when the juice extracting screw assembly rotates in the housing.

3. The juicer set forth in claim 1, wherein the residue check structure comprises a plurality of residue pushers on the lower part of the strainer.

4. The juicer set forth in claim 3, wherein the residue check structure further comprises:
a connection part tapering inwards and extending from the lower part of the strainer towards the residue pushing groove; and
a residue check screen extending further towards the residue pushing groove from a lower end of the connection part, thereby preventing the residue in the residue pushing groove from flowing radially inwards.

5. The juicer set forth in claim 4, wherein the plurality of residue pushers are provided on an outer side of the connection part.

6. The juicer set forth in claim 3, wherein each of the residue pushers comprises:
a first face oriented approximately towards a rotation direction of the juice extracting screw assembly; and
a second face oriented approximately opposite to the rotation direction of the juice extracting screw assembly,
wherein the first face inclines more than the second face in relation to a rotation axis of the juice extracting screw assembly.

7. The juicer set forth in claim 6, wherein the first face obliquely faces the residue pushing groove.

8. The juicer set forth in claim 6, wherein each of the residue pushers further comprises a third face between the first and second faces and facing an inner side of the housing.

9. The juicer set forth in claim 8, wherein the third face outwardly protrudes from an outer surface of the strainer in a radial direction.

10. The juicer set forth in claim 3, wherein the at least one juice extracting blade extends further along on an outer surface of the strainer.

11. The juicer set forth in claim 10, wherein the at least one juice extracting blade extends to the lower part of the strainer and at least one of the plurality of residue pushers is connected with the at least one juice extracting blade.

12. The juicer set forth in claim 11, wherein each of the residue pushers comprises at least one face continuing from a face of the at least one juice extracting blade, the at least one face of the residue pusher comprising at least one of:
a first face oriented approximately towards a rotation direction of the juice extracting screw assembly;
a second face oriented approximately opposite to the rotation direction of the juice extracting screw assembly; and a third face between the first and second faces and facing an inner side of the housing.

13. The juicer set forth in claim 1, wherein a rotation axis of the juice extracting screw assembly aligns vertically and a lower part of the juice extracting screw assembly tapers downwards.

14. The juicer set forth in claim 13, wherein a taper angle of the lower part of the juice extracting screw assembly ranges from 4° to 10°.

15. The juicer set forth in claim 4, wherein the residue check structure further comprises a plurality of residue check pieces provided on a lower end of the residue check screen and protrudes downwards.

16. The juicer set forth in claim 15, wherein each of the residue check pieces has a bent shape which is bent from an outside to an inside in a rotating direction of the juice extracting screw assembly.

* * * * *